(12) United States Patent
Kohn et al.

(10) Patent No.: US 6,253,970 B1
(45) Date of Patent: Jul. 3, 2001

(54) AEROSOL CONTAINER WITH SAFETY DEVICE

(75) Inventors: Udo Kohn, Dieburg; Andreas Pohler, Nauheim, both of (DE)

(73) Assignee: Wella Aktiengesellschaft, Dramstadt (DE)

( * ) Notice: Subject to any disclaimer, the term of this patent is extended or adjusted under 35 U.S.C. 154(b) by 0 days.

(21) Appl. No.: 09/490,711

(22) Filed: Jan. 24, 2000

(30) Foreign Application Priority Data

Feb. 17, 1999 (DE) ................................ 199 06 576

(51) Int. Cl.$^7$ .................................................. B65D 83/00
(52) U.S. Cl. ....................... 222/397; 222/396; 222/402.1; 137/852; 137/843
(58) Field of Search .................................... 222/396, 397, 222/402.1; 137/859, 843, 852

(56) References Cited

U.S. PATENT DOCUMENTS

| | | | |
|---|---|---|---|
| 3,283,959 | * 11/1966 | Muller | 222/396 |
| 3,512,685 | * 5/1970 | Ewald | 222/396 |
| 5,199,615 | 4/1993 | Downing | 222/397 |

* cited by examiner

*Primary Examiner*—Kevin Shaver
*Assistant Examiner*—Frederick C Nicolas
(74) *Attorney, Agent, or Firm*—Michael J. Striker

(57) ABSTRACT

The aerosol container has a container neck (1); a valve disk (5) arranged in the container neck at least partially sealed to its interior wall (12); a valve device (6) secured in the valve disk for dispensing product from an interior space (11); a circumferential sealing element (3) arranged between a facing or top surface (4) of the container neck and a peripheral edge portion (7) of the valve disk; at least one weakly sealed section (10) provided in the container neck (1) near the sealing element (3) and at least one channel (13) provided in interior wall (12) of the container neck (1), extending to the sealing element (3) from the interior space (11) and reaching or ending at the at least one weakly sealed section (10); whereby product can escapes when a pressure in the interior space exceeds a predetermined limiting value. In a preferred embodiment four channels (13) for venting product and four weakly sealed sections are provided spaced 90° from each other around the container neck.

7 Claims, 4 Drawing Sheets

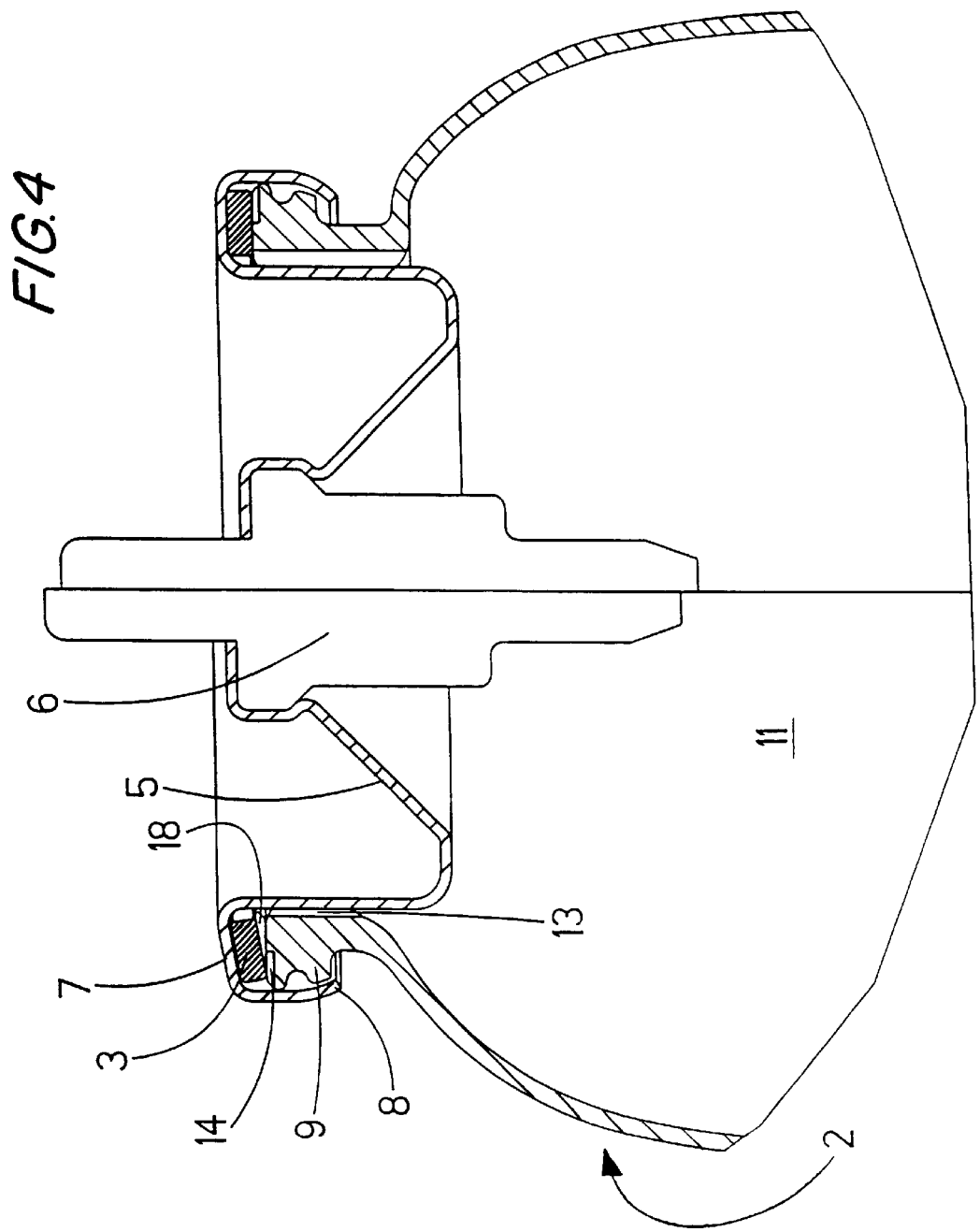

AEROSOL CONTAINER WITH SAFETY DEVICE

BACKGROUND OF THE INVENTION

1. Field of the Invention

The present invention relates to an aerosol container with a container neck, a valve disk in the container neck, a valve device in the valve disk, a circumferential sealing element arranged between an annular facing surface of the container neck and a peripheral edge portion of the valve disk and a weakly sealed section in the vicinity of the sealing element.

2. Prior Art

When an aerosol container is heated its internal pressure increases. When the internal pressure becomes too high, the valve device for the aerosol container can be uncontrollably forced out of the valve disk. For that reason safety systems have been developed, which permit a controlled release of the excess pressure from the aerosol container.

U.S. Pat. No. 5,199,615 describes an aerosol container with this sort of safety system. Weakly sealed sections are provided in this container by reducing the seal width at one or more positions at the seal by a vertical channel to the outer surface of the container neck. If the container is strongly heated so that it deforms, the product in the container can escape downward from the peripheral edge of the valve disk by means of the reduced seal width and the channels.

The safety system known from U.S. Pat. No. 5,199,615 has the disadvantage that it will not operate in an aerosol container in which the valve disk is sealed to the inner surface of the container neck.

SUMMARY OF THE INVENTION

It is an object of the present invention to provide an aerosol container of the above-described type, in which the valve disk is sealed at least to a portion of the inner surface of the container neck, with an operable safety system or safety device.

This object, and others which will be made more apparent hereinafter, are attained in an aerosol container comprising a container neck having an annular facing or top surface and an interior wall; a valve disk arranged in the container neck, including a peripheral edge portion and at least partially sealed to the interior wall; a valve device arranged in the valve disk for dispensing product from an interior space in the container; a circumferential sealing element arranged between the annular facing surface of the container neck and the peripheral edge portion of the valve disk and at least one weakly sealed section provided in the container neck in the vicinity of the sealing element.

According to the invention at least one channel for product flow is provided at the interior wall of the container neck, which extends from the interior space provided in the aerosol container to the sealing element and which reaches or ends the at least one weakly sealed section.

The device according to the invention advantageously provides a safety system for an aerosol container in which the valve disk is sealed at least partially to the interior surface of the container neck. Since the channel or channels is or are provided at the interior surface of the container neck and extends or extend to the sealing element from the container interior chamber or space, a valve disk that contacts on at least a substantial portion of the inner surface of the container neck can be used in the container. The valve disk thus has an especially exact seat on the container neck. The at least one channel serves to provide a connection between the container interior space and the at least one weakly sealed section. If the container is heated, the pressure in the container increases. If the container is made of plastic material, also the container neck can soften and deform. Independently of whether a metallic container or a plastic container is provided, the increased pressure is conducted through the channel or channels directly to the weakly sealed section or sections. Product is released from the container there when the pressure becomes sufficiently great, i.e. when it exceeds a predetermined limiting value. The at least one channel can be provided by at least one cavity or recess in the container neck or in a part of the valve disk contacting on or bearing on the interior wall of the container neck.

Various preferred embodiments of the invention are described in the following and claimed in the appended dependent claims.

In a preferred embodiment the at least one channel can be provided by at least one cavity or recess in the container neck. Alternatively, the at least one channel can be provided in a part of the valve disk contacting on or bearing on the interior wall of the container neck.

In a preferred embodiment a recess or cavity in the circumferential facing surface of the container neck that does not extend entirely radially through the container neck provides a comparatively simple and reliable weakly sealed section that reduces the effective sealed width. If the recess or cavity is a groove, it can be provided in a simple manner in the facing surface of the container neck.

In a further preferred embodiment the facing surface of the container neck has a sealing portion bearing on the sealing element and the sealing portion has at least one interrupting portion arranged at the at least one channel, extending in a circumferential direction and acting as an additional weakly sealed section. The seal is further weakened by this interrupting portion. Also a deformation of the container neck at this interrupting portion is more likely than at the sealing portion bearing on the sealing element, since the retaining force between the container neck and the valve disk is reduced at this interrupting section because of the reduced amount of the material. Since the height of the top surface of the container neck in the interrupting section is clearly less than its height in the sealing element, but for the case of normal pressure in the interior a reliable seal is provided also in the vicinity of the interruption section.

In a preferred embodiment four channels and four weakly sealed sections have proven especially beneficial for good centering of the valve cover on the container neck. An embodiment in which the channels are arranged around the circumference of the container neck spaced 90° from each other is particularly preferred.

BRIEF DESCRIPTION OF THE DRAWING

The objects, features and advantages of the invention will now be illustrated in more detail with the aid of the following description of the preferred embodiments, with reference to the accompanying figures in which:

FIG. 4 shows two cutaway partial vertical cross-sectional action views of the device shown in FIG. 1, in which the left hand view shows the container in a state with an excessive internal pressure and with the weakly sealed sections opened and the right hand view shows the container with a normal pressure.

DETAILED DESCRIPTION OF THE PREFERRED EMBODIMENTS

Figure 1:
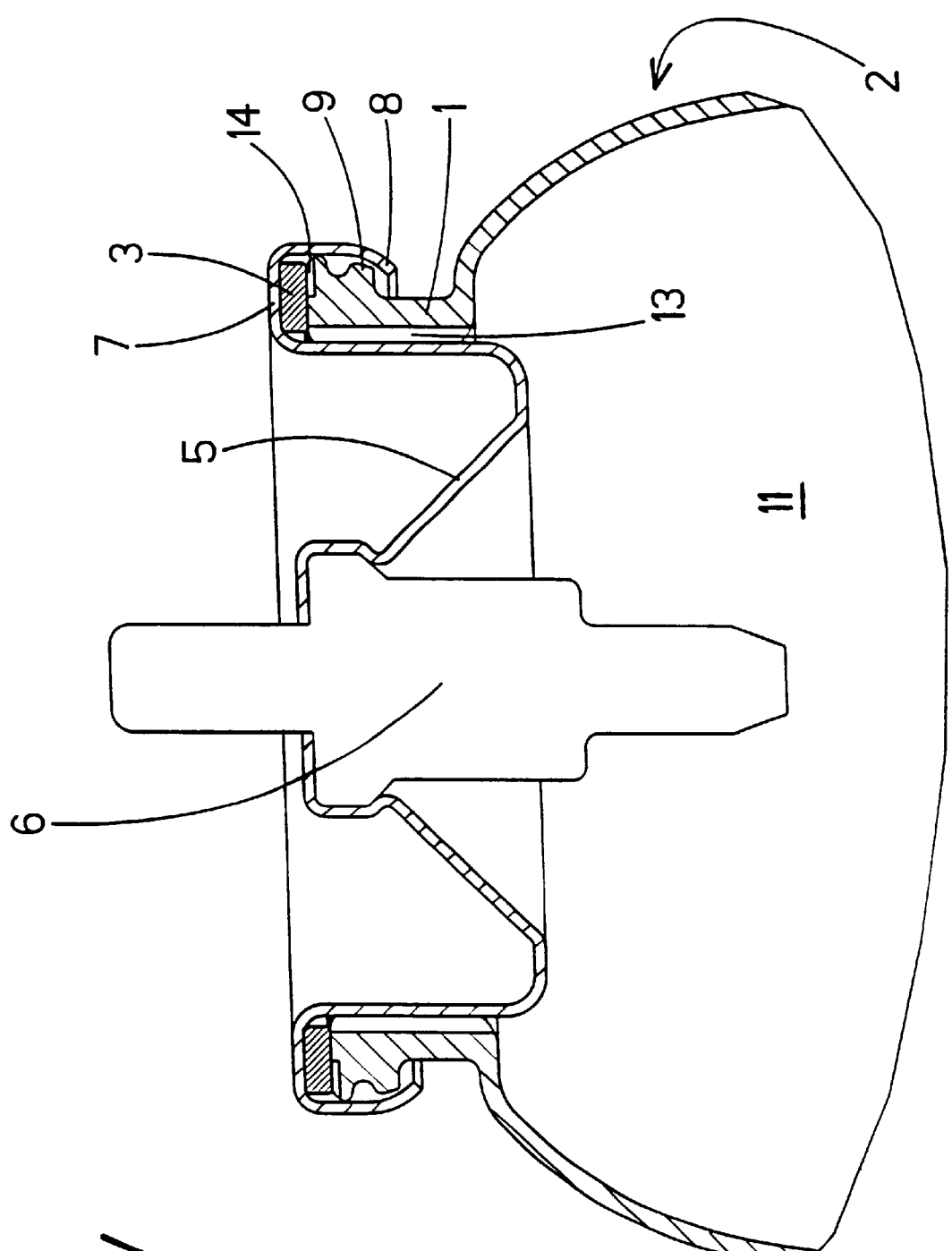
FIG. 1 is a cutaway vertical cross-sectional view through a container neck of an aerosol container with a valve disk, a circumferential sealing element between an annular facing surface of the container neck and a peripheral edge portion of the valve disk, a valve arranged in the valve disk, weakly sealed sections formed by grooves in the facing surface and channels extending between the valve disk and the container neck and connecting the container interior space with the weakly sealed sections.
Figure 2:
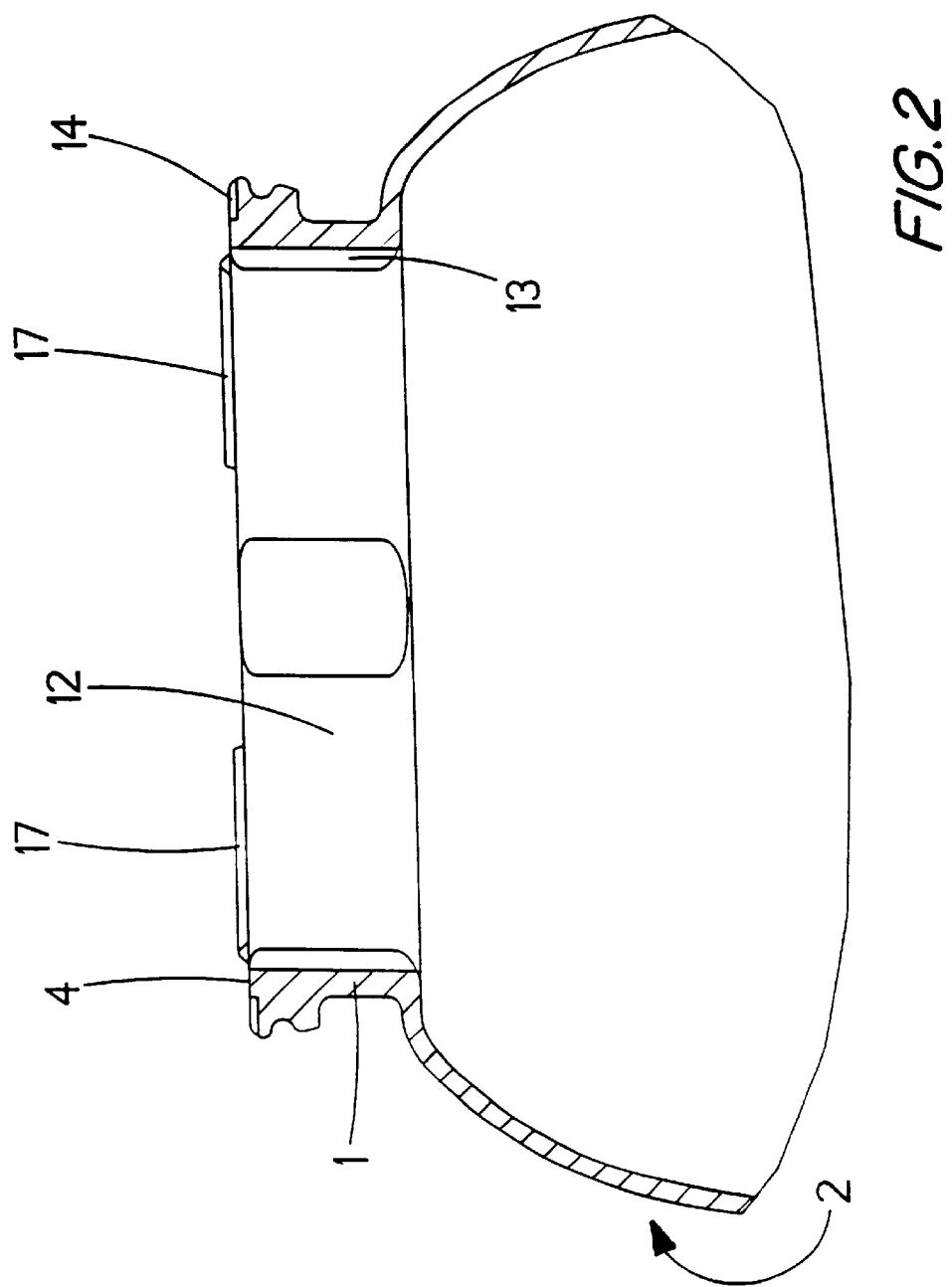
FIG. 2 is a cutaway partially vertical cross-sectional, partially side view of the container neck of FIG. 1, but without the valve disk, valve and seal.
Figure 3:
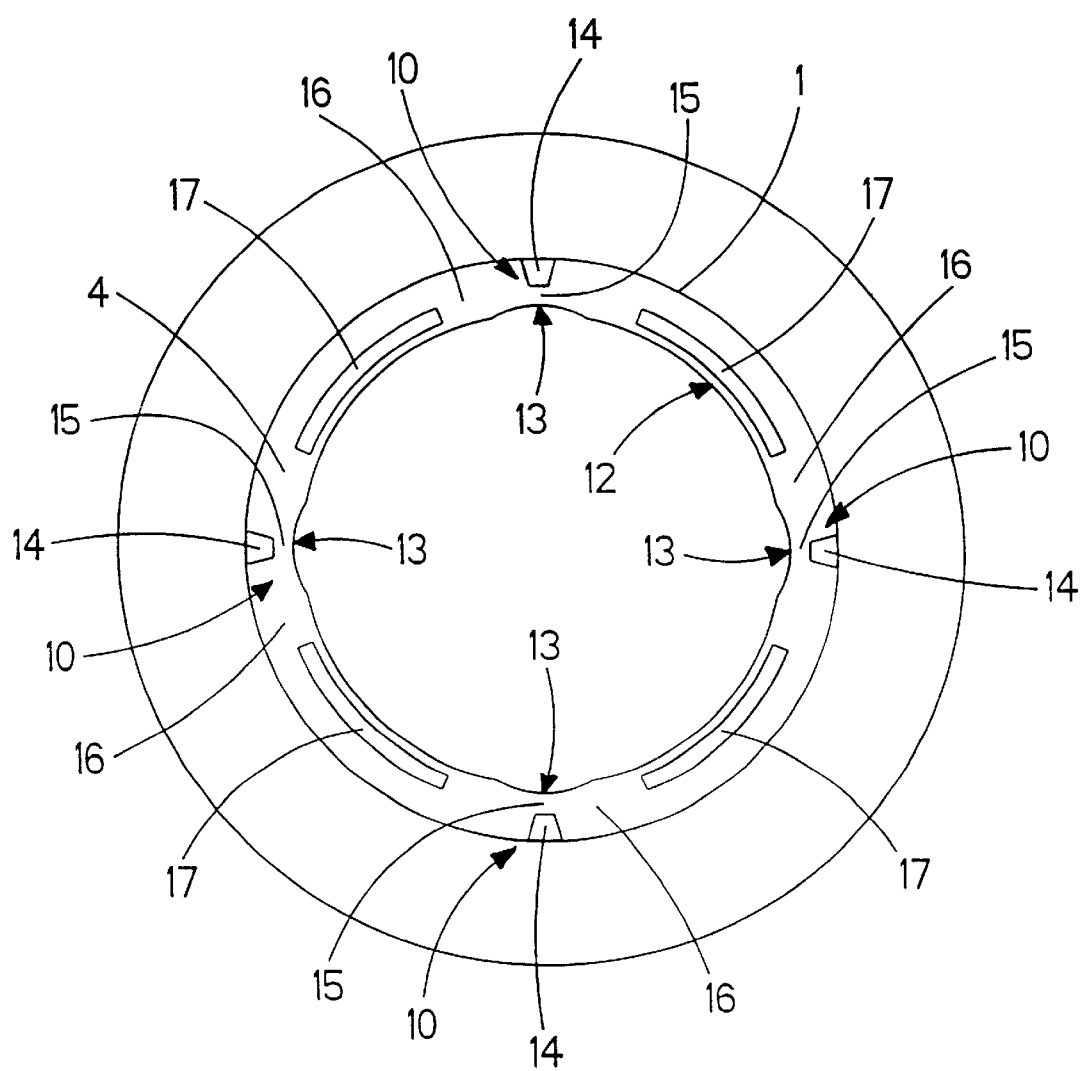
FIG. 3 is a top plan view of the facing surface of the container neck with four weakly sealed sections in the form of four grooves in a peripheral lip of the neck and respective channels to the weakly sealed sections.

A circumferential sealing element 3 is provided on the container neck 1 of an aerosol container 2 between an annular facing surface 4 of the container neck 1 and a valve disk 5 in order to seal the aerosol container 2. The valve disk 5 supports a valve 6 in its center for dispensing product contained in the aerosol container 2. The aerosol container 2 is made of plastic. A peripheral edge portion 7 of the valve disk 5 contacts or bears on the sealing element 3. A shaped part 8 of the edge portion 7 engages under a peripheral lip 9 of the aerosol container 2.

Four weakly sealed sections 10 are provided in the peripheral lip 9 in the vicinity of the sealing element 3. Product can flow out from the aerosol container 2 at these weakly sealed sections 10 when an undesired high or excess pressure is produced in an interior space or chamber 11 of the aerosol container 2, e.g. by heating the aerosol container 2. Four channels 13 extending to the sealing element 3 are provided in the interior wall 12 of the container neck 1. Each channel 13 extends from the interior space 11 to one of the weakly sealed sections 10 and transmits the pressure in the interior space 11 to this weakly sealed section 10. The four channels 13 are formed by four grooves provided in the interior wall 12 of the container neck 1. The grooves remain open and act as channels 13 when the rotationally symmetric valve disk 5 is inserted in the container neck 1. The four channels 13 and the four weakly sealed sections 10 are distributed around the container neck 1 spaced 90° from each other.

Recesses or cavities 14 are provided in the facing surface 4 to form the respective weakly sealed sections 10. These recesses or cavities 14 do not extend or penetrate through the entire width of the facing surface 4 and reduce the sealed width of the seal at the sealing element 3 to a comparatively small sealed width 15. The recess or cavity is a groove. Interrupting portions 16 of sealing portion 17 of the facing surface 4 arranged at the respective channels 13 operate as additional weakly sealed sections 10. The height of surface of the facing surface 4 at these interrupting portions is clearly less than the height of the sealing element 3. Besides reducing the effectiveness of the seal, the interrupting portions 16 reduce the stability of the connection between the container neck 1 and the valve disk 5. Also the recesses or cavities 14 and the channels 13 weaken the container neck 1 locally.

During an undesired heating of the aerosol container 2 either the container neck 1 deforms or the valve disk 5 inclines or tilts, or both occur at the same time. Product in the aerosol container 2 is thus present in gaseous form in the channels 13. Outlet openings 18 thus form between the facing surface 4 and the sealing element 3 through which product flows from the aerosol container 2 because of the deformation of the weakly sealed sections 10 or the tilting of the valve disk 5.

While the invention has been illustrated and described as embodied in an aerosol container with safety device, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. An aerosol container comprising
   a container neck (1) having a facing surface (4) and an interior wall (12);
   a valve disk (5) arranged in the container neck, including a peripheral edge portion (7) and at least partially sealed to said interior wall (12);
   a valve device (6) arranged in the valve disk for dispensing product from an interior space (11);
   a circumferential sealing element (3) arranged between the facing surface (4) of the container neck and the peripheral edge portion (7) of the valve disk;
   at least one weakly sealed section (10) provided in the container neck (1) in the vicinity of the sealing element (3); and
   is at least one channel (13) provided in said interior wall (12) of the container neck (1), extending to the sealing element (3) from the interior space (11) and located at said at least one weakly sealed section (10);
   whereby said product in said interior space escapes through said at least one channel (13) and said at least one weakly sealed section (10) and between said facing surface (4) of said container neck and said sealing element (3) when a pressure in said interior space exceeds a predetermined limiting value.

2. The aerosol container as defined in claim 1, wherein said at least one weakly sealed section (10) include at least one cavity or recess (14) provided in said facing surface (4) of said container neck (1) and said at least one cavity or recess (14) does not extend entirely through said facing surface (4) but only reduces a sealed width (15) at said facing surface (4).

3. The aerosol container as defined in claim 1, wherein said at least one channel consists of four channels and said at least one weakly sealed section consists of four weakly sealed sections.

4. The aerosol container as defined in claim 1, wherein said at least one channel (13) is provided in a part of the valve disk (5) contacting on or bearing on the interior wall (12) of the container neck (1).

5. The aerosol container as defined in claim 2, wherein said at least one cavity or recess (14) is at least one groove provided in said facing surface (4) of said container neck (1).

6. The aerosol container as defined in claim 3, wherein said four channels are spaced about 90° from each other around said container neck (1).

7. An aerosol container comprising
   a container neck (1) having a facing surface (4) and an interior wall (12);

a valve disk (5) arranged in the container neck, including a peripheral edge portion (7) and at least partially sealed to said interior wall (12);

a valve device (6) arranged in the valve disk for dispensing product from an interior space (11);

a circumferential sealing element (3) arranged between the facing surface (4) of the container neck and the peripheral edge portion (7) of the valve disk;

at least one weakly sealed section (10) provided in the container neck (1) in the vicinity of the sealing element (3); and at least one channel (13) provided at said interior wall (12) of the container neck (1), extending to the sealing element (3) from the interior space (11) and located at said at least one weakly sealed section (10);

wherein said facing surface (4) has a sealing portion (17) bearing on said sealing element (3) and said sealing portion (17) has at least one interrupting portion (16) arranged at said at least one channel (13), extending in a circumferential direction and forming an additional weakly sealed section (10) and a height of said facing surface (4) in said at least one interrupting portion (16) is less than a height of said sealing element (3);

whereby said product in said interior space escapes through said at least one channel (13) and said at least one weakly sealed section (10) and between said facing surface (4) of said container neck and said sealing element (3) when a pressure in said interior space exceeds a predetermined limiting value.

\* \* \* \* \*